US012166312B2

(12) United States Patent
Szelag et al.

(10) Patent No.: US 12,166,312 B2
(45) Date of Patent: Dec. 10, 2024

(54) HOUSING FOR AN ELECTRICAL CONNECTOR

(71) Applicants: TE Connectivity Nederland BV, s'Hertogenbosch (NL); TE Connectivity Germany GmbH, Bensheim (DE)

(72) Inventors: Martin Szelag, Bensheim (DE); Ole Wiborg, Bensheim (DE); Jeroen De Bruijn, Hertogenbosch (NL); Franz Mueller, Bensheim (DE)

(73) Assignees: TE Connectivity Nederland BV, s'Hertogenbosch (NL); TE Connectivity Germany GmbH, Bensheim (DE)

( * ) Notice: Subject to any disclaimer, the term of this patent is extended or adjusted under 35 U.S.C. 154(b) by 93 days.

(21) Appl. No.: 17/704,637

(22) Filed: Mar. 25, 2022

(65) Prior Publication Data

US 2022/0216646 A1 Jul. 7, 2022

Related U.S. Application Data

(63) Continuation of application No. PCT/EP2020/076599, filed on Sep. 23, 2020.

(30) Foreign Application Priority Data

Sep. 27, 2019 (EP) .................................... 19200239

(51) Int. Cl.
*H01R 13/00* (2006.01)
*H01R 13/58* (2006.01)
(Continued)

(52) U.S. Cl.
CPC ....... *H01R 13/582* (2013.01); *H01R 13/5841* (2013.01); *H01R 13/625* (2013.01); *H01R 13/629* (2013.01); *H01R 24/005* (2013.01)

(58) Field of Classification Search
CPC ......................... H01R 13/582; H01R 13/5841; H01R 13/625; H01R 13/628; H01R 24/005
See application file for complete search history.

(56) References Cited

U.S. PATENT DOCUMENTS 7,972,150 B1 * 7/2011 Lin .................... H01R 13/6461 439/607.03
9,553,392 B2 1/2017 Thelen
(Continued)

FOREIGN PATENT DOCUMENTS

DE 202008008915 U1 11/2009
DE 102014110066 A1 1/2016
(Continued)

OTHER PUBLICATIONS

Extended European Search Report, Application No. 19200239.2-1201, Dated: Mar. 16, 2020, 8 pages.
(Continued)

*Primary Examiner* — Phuong Chi Thi Nguyen
(74) *Attorney, Agent, or Firm* — Barley Snyder

(57) ABSTRACT

A housing for an electrical connector includes a housing body having an opening receiving a cable in an insertion direction and a pair of cable covers hinged to the housing body at a proximal end of each cable cover of the pair of cable covers. The pair of cable covers extend away from the opening. Each of the cable covers is pivoted away from the other cable cover in a cable mounting position and each cable cover is pivoted toward the other cable cover to form a cable support sleeve supporting the cable in an operating position.

26 Claims, 4 Drawing Sheets

(51) Int. Cl.

| | |
|---|---|
| ***H01R 13/625*** | (2006.01) |
| ***H01R 13/629*** | (2006.01) |
| ***H01R 24/00*** | (2011.01) |

(56) References Cited

U.S. PATENT DOCUMENTS

| | | | | |
|---|---|---|---|---|
| 9,553,402 | B2 * | 1/2017 | Thelen .................. | H01R 13/59 |
| 10,840,635 | B2 | 11/2020 | Zellner et al. | |
| 2015/0236432 | A1 | 8/2015 | Lin | |
| 2016/0072235 | A1 | 3/2016 | Strelow et al. | |
| 2017/0155217 | A1 | 6/2017 | Plamondon et al. | |

FOREIGN PATENT DOCUMENTS

| | | | |
|---|---|---|---|
| DE | 102017110546 | B3 | 7/2018 |
| EP | 1624534 | A2 | 2/2006 |
| EP | 2045884 | A1 | 10/2007 |
| EP | 1914844 | A2 | 4/2008 |
| EP | 2924812 | A1 | 3/2015 |
| JP | H10162900 | A | 6/1998 |
| JP | 2016522549 | W | 7/2016 |
| WO | 2014178862 | A1 | 11/2014 |
| WO | 2016008775 | A1 | 1/2016 |
| WO | 2017066163 | A1 | 4/2017 |
| WO | 2018116239 | A1 | 6/2018 |

OTHER PUBLICATIONS

PCT Notification, The International Search Report and the Written Opinion of the International Searching Authority, International Application No. PCT/EP2020/076599, dated Nov. 19, 2020, 15 pages.

Office Action from Japan's Patent Office dated Mar. 22, 2023 (with English Translation thereof), corresponding to Application No. 2022-518749, 9 pages.

* cited by examiner

HOUSING FOR AN ELECTRICAL CONNECTOR

CROSS-REFERENCE TO RELATED APPLICATIONS

This application is a continuation of PCT International Application No. PCT/EP2020/076599, filed on Sep. 23, 2020, which claims priority under 35 U.S.C. § 119 to European Patent Application No. 19200239.2, filed on Sep. 27, 2019.

FIELD OF THE INVENTION

The present invention relates to an electrical connector and, more particularly, to a housing for an electrical connector.

BACKGROUND

Electrical connectors, such as network connectors, usually comprise a cable outlet arranged at a rear side of the electrical connector. For physical and electrical protection, a housing is provided for receiving the electrical connector. As the cable exits the cable outlet, sufficient space is necessary to install the cable, which is a rare commodity in various applications. Therefore, there is a demand for space-saving housings, which redirect the cable in such a way that minimal space is occupied when installed. However, depending on the application, the cable must be redirected in different directions, resulting in a large stock of different housings, which increases production costs and storage costs.

SUMMARY

A housing for an electrical connector includes a housing body having an opening receiving a cable in an insertion direction and a pair of cable covers hinged to the housing body at a proximal end of each cable cover of the pair of cable covers. The pair of cable covers extend away from the opening. Each of the cable covers is pivoted away from the other cable cover in a cable mounting position and each cable cover is pivoted toward the other cable cover to form a cable support sleeve supporting the cable in an operating position.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
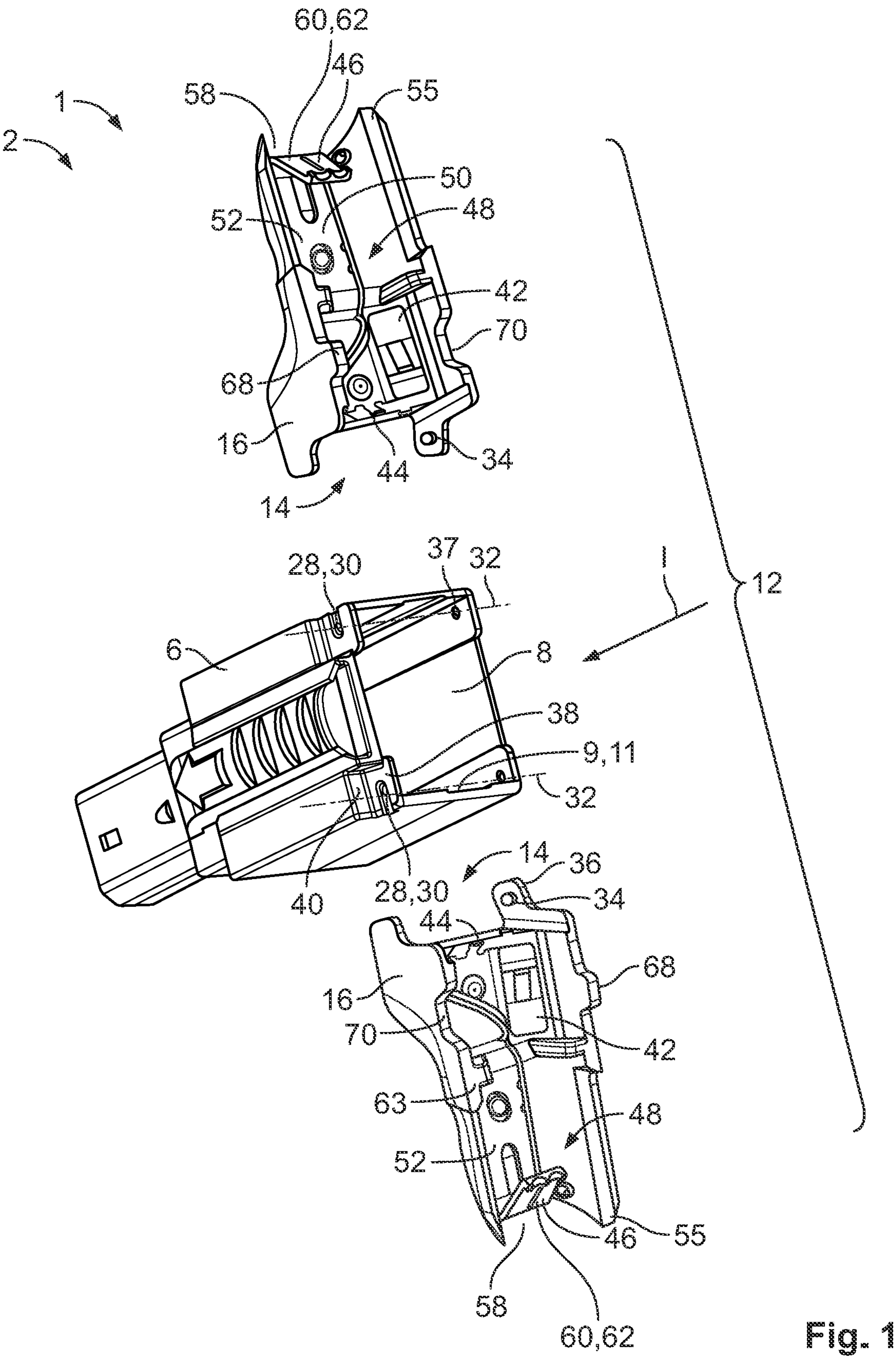
FIG. 1 is an exploded perspective view of a housing according to an embodiment.

In the following, the housing, according to the invention, is explained in greater detail with reference to the accompanying drawings in which exemplary embodiments are shown.

In the figures, the same reference numerals are used for elements which correspond to one another in terms of their function and/or structure.

According to the description of the various aspects and embodiments, elements shown in the drawings can be omitted if the technical effects of those elements are not needed for a particular application, and vice versa: i.e. elements that are not shown or described with reference to the figures can be added if the technical effect of those particular elements is advantageous in a specific application.

First, the inventive housing 1 is explained with reference to FIGS. 1 and 2. FIG. 1 shows a schematic exploded view of an exemplary embodiment of the housing 1 according to the invention, and FIG. 2 shows a schematic perspective view of the housing 1 in a mounting position 2.

The housing 1 is adapted for an electrical connector 4, having a housing body 6 and an opening 8 configured to receive an electrical cable 10 in an insertion direction I. A pair of cable covers 12 is hinged to the housing body 6 at a proximal end 14 of the respective cable cover 16 of the pair of cable covers 12 extending away from the opening 8. In the cable mounting position 2 as shown in FIG. 2, each cable cover 16 of the pair of cable covers 12 is pivoted away from the other cable cover 16 of the pair of cable covers 12 allowing the insertion of the electrical cable 10 into the opening 8 in the insertion direction I.

Figure 2:
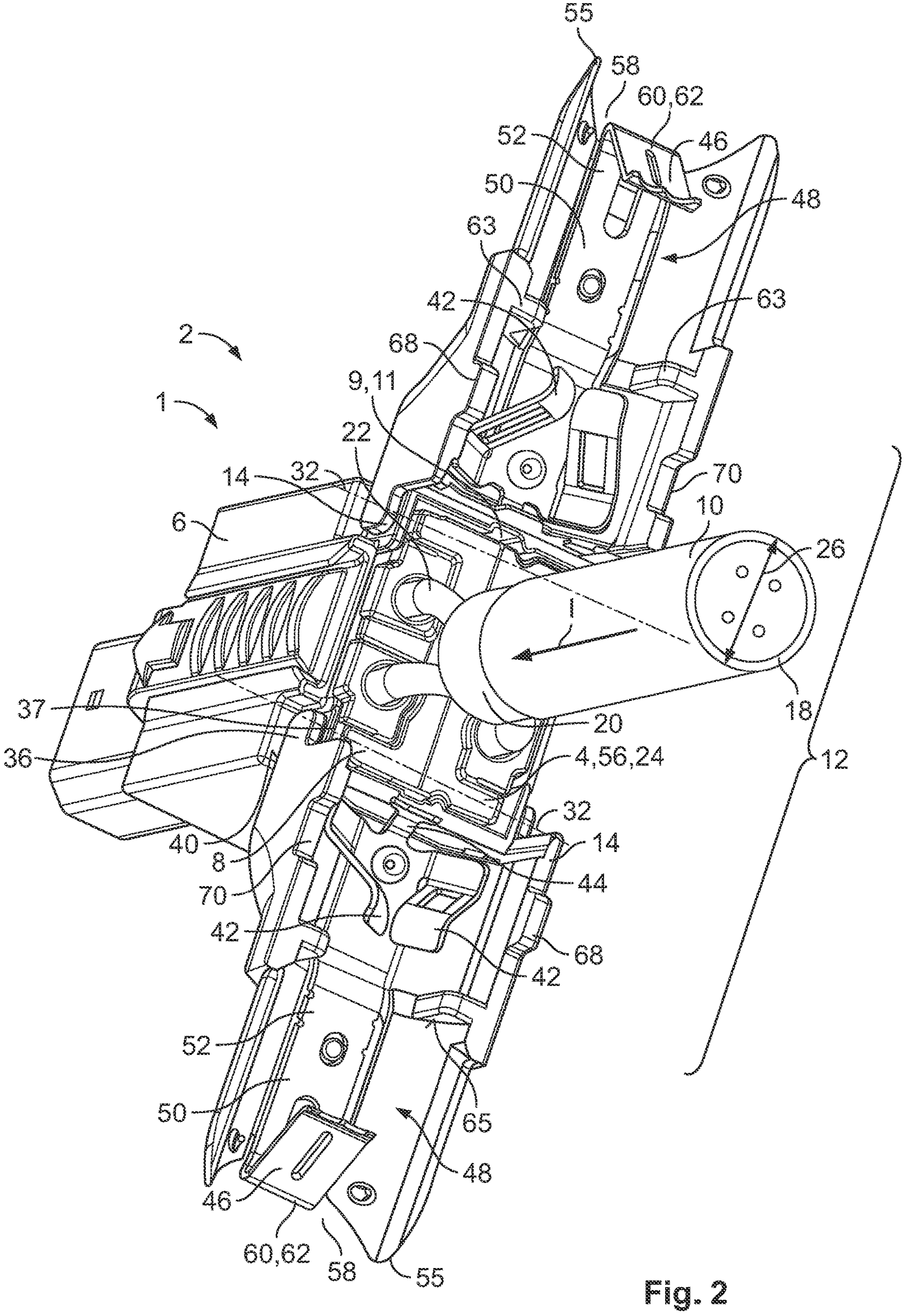
FIG. 2 is a perspective view of the housing in a mounting position.

The housing body 6 may be provided with a polarization element 9, shown in FIGS. 1 and 2. In this exemplary embodiment, the polarization element 9 is formed by two guiding notches 11 extending from the entrance of the opening 8 in the insertion direction I. The electrical connector 4, shown in FIG. 2, may comprise protrusions adapted to be received in the respective notches 11. Therefore, the electrical connector 4 can only be inserted into the opening 8 in the insertion direction I, when the protrusions are aligned with the guiding notches 11. The guiding notches 11 are, in an embodiment, arranged opposite to one another and spaced apart from a middle axis essentially perpendicular to the insertion direction I, so that the opening 8 comprises an asymmetrical cross section in a plane essentially perpendicular to the insertion direction I. Due to the asymmetrical cross section, the orientation of the electrical connector 4 in which it can be inserted into the opening 8 is predetermined. This may further fool-proof the connection system. Of course, different embodiments of the polarization element 9 may be envisioned, such as guiding rails or ribs. The housing body 6 may be formed of an electrically insulating material. The housing body 6 may be formed by injection molding allowing for a cost-efficient production, particularly for mass scale.

The cable 10 may comprise an insulation 18 and a cable braid 20 arranged coaxially under the insulation 18, as shown in FIG. 2. The cable 10 may further be comprised of multiple wires 22, which are terminated in a wire organizer 24 that is inserted in the opening 8 of the housing body 6. In an embodiment, the cable 10 has a predetermined cable diameter 26, so that the pair of cable covers 12 may provide a strain relief in an operating position, shown in FIG. 3.

The electrical connector 4 may be a termination unit in which the wires 22 of the cable 10 may be terminated. The termination unit may be inserted into the opening 8 of the housing body 6 and may be connected to a further connector element, such as a plug terminal.

The housing body 6 comprises a bearing 28 in the form of two holes 30 arranged on opposing sides of the opening 8, as shown in FIG. 1. The holes 30 are arranged coaxially to one another forming a pivoting axis 32 essentially perpendicular to the insertion direction I. A second bearing 28 is provided on the other side of the opening 8 forming a second pivoting axis 32 extending essentially parallel to the first pivoting axis 32.

Each cable cover 16 of the pair of cable covers 12 comprises pins 34 adapted to be fittingly inserted into the respective holes 30 formed on opposing latches 36. Therefore, a cable cover 16 of the pair of cable covers 12 may be hinged to either of the bearings 28 and the other cable cover 16 of the pair of cable covers 12 to the other bearing 28.

The holes 30 may be closed towards the opening 8. At the closed hole 30 on the side facing the opening 8, an electrically conductive element 37 may be provided, as shown in FIG. 1, the conductive element 37 forming a bulge and being adapted to contact the electrical connector 4, when the connector 4 is inserted. Thus, the electrically conductive element 37 may act as a further shielding for the connector 4. The electrically conductive element 37 may be formed onto the closed hole 30 or may close the hole 30 itself.

Figure 3:
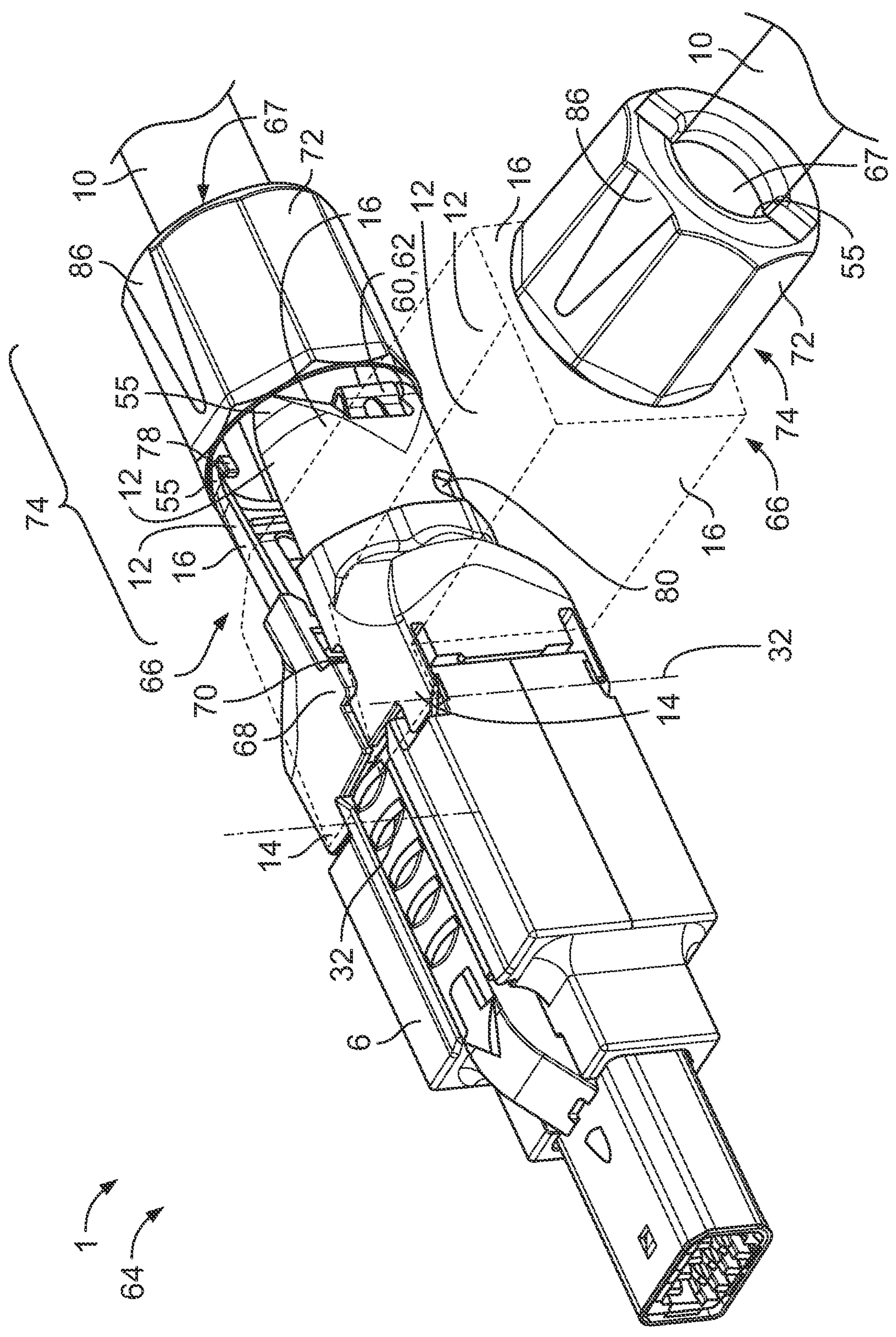
FIG. 3 is a perspective view of the housing in an operating position with different pairs of cable covers.

The bearings 28 are formed in a depression 38 of the housing body 6 forming a blocking surface 40, which may block the cable cover 16 from pivoting too far away from the other cable cover 16, as shown in FIG. 1. In an embodiment, the hinged cable cover 16 may be pivotable at an angle of about 90° from the mounting position 2 shown in FIG. 2 to the operating position as shown in FIG. 3. Thus, in the mounting position 2, the pair of cable covers 16 do not block the insertion of the cable 10 into the opening 8.

As can be seen in FIG. 2, each cable cover 16 of the pair of cable covers 12 may comprise a grounding spring 42, a fixation latch 44, and a strain relief spring 46 mounted to an interior side 48 facing towards the other cable cover 16 in the operating position. The grounding springs 42, fixation latch 44, and strain relief spring 46 are each formed integrally with one another as a monolithic component 50, for example as a leaf spring.

The monolithic component 50 comprises a main spring body 52 which is rigidly mounted to the interior side 48 of the respective cable cover 16. The main spring body 52 may extend from the proximal end 14 of the respective cable cover 16 of the pair of cable covers 12 to a distal end 55 of the respective cable cover 16. At the proximal end 14, the main spring body 52 may be provided with the fixation latch 44, which may be bent at about 90° from the main spring body 52. The at least one strain relief spring 46 and at least one grounding spring 42 may be formed as a stamped metal sheet that is bent into a form. The at least one strain relief spring 46 and the at least one grounding spring 42 may be formed as bent latches from the main spring body 52 that may be fastened to the respective cable cover 16.

The fixation latch 44 is adapted to extend into the opening 8 such that the fixation latch 44 overlaps with a cross section 54 of the opening 8 in a plane perpendicular to the insertion direction I. Therefore, the electrical connector 4, e.g. a cable organizer 56, can be secured in the opening 8 by the fixation latch 44 during operation blocking a disengagement of the electrical connector 4 and the housing 1 due to vibrations or similar.

The at least one strain relief spring 46 and the at least one fixation latch 44 may be formed integrally with one another as a monolithic component. The at least one strain relief spring 46 and the at least one fixation latch 44 may be formed as a stamped metal sheet that is bent into form. The at least one strain relief spring 46 and the at least one fixation latch 44 may be formed as bent latches from a main spring body 52. The at least one strain relief spring 46 and the at least one fixation latch 44 may be formed on opposing ends of the main spring body 52, whereby the at least one fixation latch 44 may be arranged at the proximal end 14 of the respective cable cover 16.

The fixation latch 44 may be adapted to be pivoted away from the opening 8 in the mounting position 2, shown in FIG. 2, allowing a free passage of the cable 10 and/or electrical connector 4 into the opening 8. In an operating position 64, shown in FIG. 3, in which the pair of cable covers 12 are pivoted towards one another, the fixation latch 44 may abut the electrical connector 4, pushing the electrical connector 4 further into the opening 8 along the insertion direction I. Consequently, the fixation latch 44 is pressed against the electrical connector 4 with a normal force, which may be transferred via the cable cover 16 to the pins 34 pressing into the bearings 28. Therefore, the electrically conductive element 37 is pressed towards the electrical connector 4 with said normal force providing a further shielding feature for the connector 4.

For grounding the electrical cable 10, grounding springs 42 are provided at each cable cover 16 of the pair of cable covers 12, as shown in FIG. 2. The grounding springs 42 may extend from the main spring body 52 as wings from the lateral sides of the main spring body 52 at the proximal end 14 of the respective cable cover 16. In this exemplary embodiment, each cable cover 16 is provided with two grounding springs 42 that are arranged along an inner circumference so that each grounding spring 42 can be pushed under the cable braid 20 of the cable 10 for grounding. The grounding springs 42 may extend from the proximal end 14 towards the distal end 55 projecting obliquely towards the other cable cover 16 of the pair of cable covers 12 at least in the operating position so that the grounding springs 42 are biased towards the cable 10 when inserted. Consequently, the grounding springs 42 may be resiliently deflected by the cable 10 adapting to the cable diameter 26. This allows for grounding of a wider range of cable diameters 26, such as from about 3.8 mm to about 8.0 mm.

At the distal end 55, the main spring body 52 may be arched back towards the proximal end 14 forming the strain relief spring 46, as shown in FIG. 2. The main spring body 52 may be arched at about 120° so that the strain relief spring 46 may be formed as a spring tongue that extends obliquely towards the opposing cable cover 16 of the pair of cable covers 12. Thus, the strain relief spring 46 may be adapted to be biased towards the cable 10 providing a strain relief for a wider range of cable diameters, such as from about 3.8 mm to about 8.0 mm. A compact design may be achieved by providing a recess or cutout 58 in the respective cable cover 16, so that the arch 60 forming a deflection section 62 of the strain relief spring 46 is arranged in the cutout 58. In this formation, the space is provided for the strain relief spring 46 to be deflected without increasing the overall dimensions of the housing 1, particularly the pair of cable covers 12. Consequently, the greater the cable diameter, the further the strain relief spring 46 is deflected radially outwards through the cutout 58.

The strain relief spring 46 is adapted to provide a strain relief for a wider range of cables 10, increasing the applicability of the housing 1, preventing mechanical force applied to the exterior of the cable 10 from being transferred to the electrical terminations within the housing 1, which could lead to failure.

To ensure the correct position of the electrical cable 10 within the housing 1, the cable cover 16 may comprise at least one positioning rib 63 protruding from the interior side 48 of the cable cover 16, as shown in FIG. 2. In an embodiment, each cable cover 16 of the pair of cable covers

12 comprises two positioning ribs 63 arranged opposite to one another, whereby the positioning ribs 63 reduce the inner diameter of the pair of cable covers 16, at least when they are pivoted towards one another. The at least one positioning rib 63 may provide an abutment surface 65 facing away from the opening 8, which may be abutted by the insulation 18 of the electrical cable 10, limiting the insertion depth of the cable 10 and ensuring that the grounding springs 42 contact the cable braid 20 in the operating position 64.

In FIG. 3, two exemplary embodiments of the housing 1 according to the invention are shown in the operating position 64. In the first embodiment shown with solid lines, the pair of cable covers 12 form a cable support sleeve 66 having a cable outlet 67 that opens parallel to the insertion direction I and the opening 8. For guiding the movement of the cable covers 16 towards each other, a guiding protrusion 68 is provided circumferentially extending from one cable cover 16 of the pair of cable covers 12. The guiding protrusion 68 may be adapted to be guided into a, in an embodiment complementary formed, receiving notch 70 on the other cable cover 16 of the pair of cable covers 12.

The second embodiment depicted with the dotted lines in FIG. 3 shows the pair of cable covers 12 forming a cable support sleeve 66 that is angled at about 90° having a cable outlet 67 oriented essentially perpendicular to the insertion direction I and the opening 8. Alternatively, the pair of cable covers 12 may be adapted to form the cable support sleeve 66 having cable outlets 67 oriented at a 90° angle, a 45° angle or anything in between 45° to 90°. Depending on the orientation relative to the insertion direction I in which the cable 10 should enter the cable support sleeve 66, a respective pair of cable covers 12 may be provided.

The cable covers 12 may be adapted for the predetermined cable diameter 26, meaning that in the operating position, the formed cable support sleeve 66 is adapted to receive the cable 10 in an essentially precise fit.

The housing body 6 may remain structurally identical in each embodiment, allowing for an easy and cost efficient production of the housing 1 in mass scale. By having identically structured hinges, i.e. the bearings 28 of the housing body 6 and the pins 34 of the respective cable covers 16, each cable cover 16 may be attached on either side of the housing body 6 changing the orientation of angled pairs of cable covers 16. The cable covers 16 may also be formed structurally identically. Consequently, by switching the position of each cable cover 16 of the second embodiment shown in FIG. 3 the cable support sleeve 66 may be oriented in the opposite direction with respect to the second embodiment shown in FIG. 3. Thus, by providing a pair of cable covers 12 wherein each cable cover 16 of the pair of cable covers 12 may be hinged to the housing 1, multiple degrees of freedom are provided for adapting the housing 1 to the application surroundings. By simply choosing a specific pair of cable covers 12, the direction and/or angular orientation of the cable support sleeve 66 cable outlet 67 relative to the insertion direction I may be determined.

According to a further advantageous embodiment, a set may be provided, the set comprising at least two housings 1 according to the invention, wherein the at least two housings 1 may comprise identically structured housing bodies 6 and different pairs of cable covers 12, the cable covers 12 forming the cable support sleeve 66. The cable outlets 67 of the different pairs of cable covers 12 may be oriented differently with respect to the insertion direction I.

For maintaining the pair of cable covers 12 in the operating position 64, a locking nut 72 may be provided, as shown in the embodiment of FIG. 3. The locking nut 72 may be adapted to receive the pair of cable covers 12 at least partially in the operating position 64, blocking the cable covers 16 from pivoting away from one another.

In order to further increase the retention-withstanding force of the housing 1, the locking nut 72 may be adapted to extend parallel to the cable 10, meaning that the locking nut 72 does not bend the cable 10. In other words, the locking nut 72 may extend coaxially with the cable 10 at the position of the locking nut 72.

In an embodiment, the locking nut 72 and the pair of cable covers 12 comprise a bayonet locking assembly 74 shown in FIG. 3 for locking the locking nut 72 to the pair of cable covers 12. The bayonet locking assembly 74 may ensure an easy locking with a simple twist and an exact orientation of the final position of the locking nut 72, which ensures not exceeding the offered space in an existing application. In particular, in comparison to a threaded locking assembly, the bayonet locking assembly 74 allows for an easier locking, especially in tight spaces. In the threaded locking assembly 74, the pair of cable covers 12 must be perfectly aligned for the locking nut 72 to be able to engage the threads of the cable covers 12. Thus, the pair of cable covers 12 must be pushed and held together in exact alignment with one hand while screwing on the locking nut 72.

Figure 5:
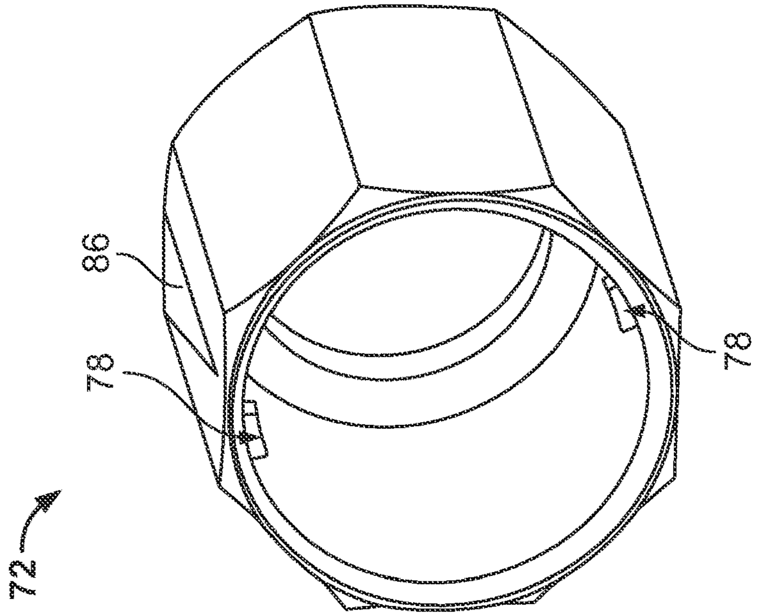
FIG. 5 is a perspective view of a locking nut of the housing.
Figure 4:
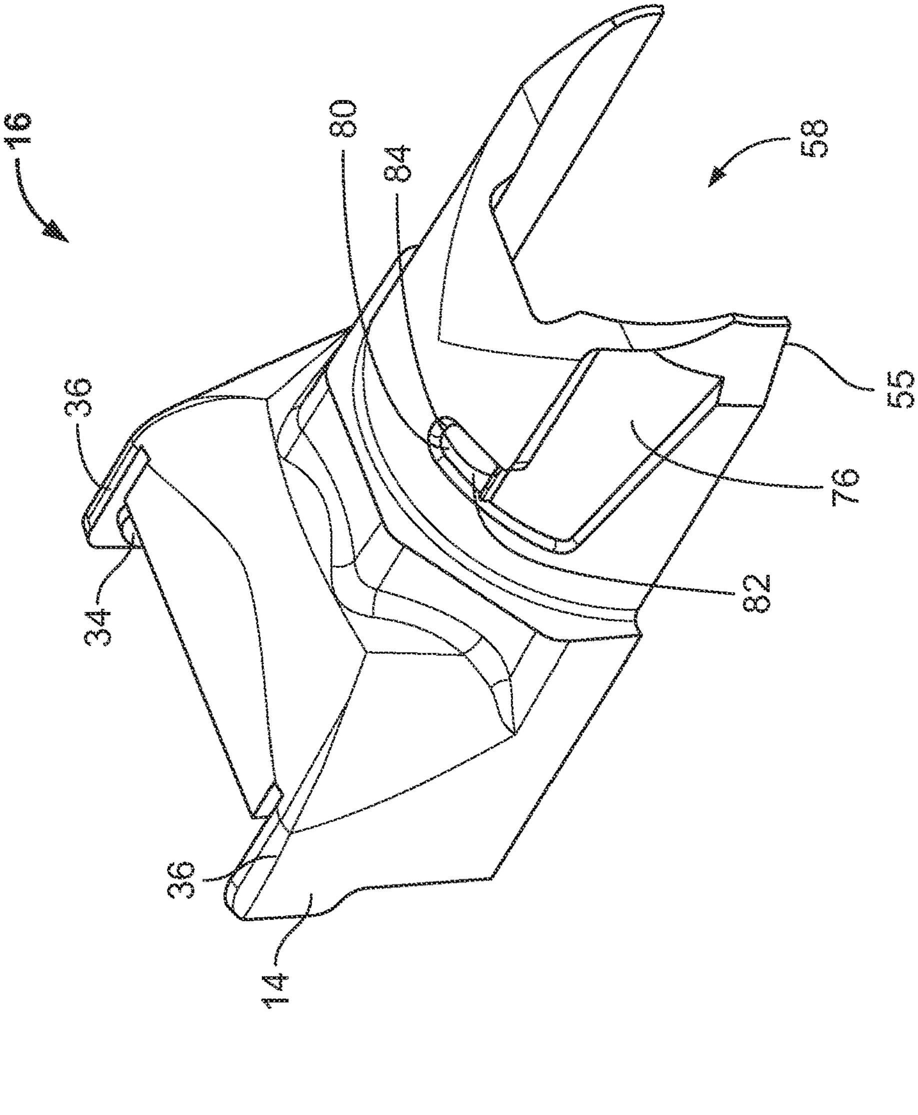
FIG. 4 is a perspective view of a cable cover of the housing.

The bayonet locking assembly 74 is further explained in detail with reference to FIGS. 3, 4 and 5. FIG. 4 shows a perspective view of a cable cover 16 of the pair of cable covers 12 and FIG. 5 shows a perspective view of a locking nut 72 according to the invention.

As can be seen in FIGS. 3 and 4, the cable cover 16 may have a tapered distal end 55 allowing the locking nut 72 to slide over the distal end 55, even when the cable covers 16 of the pair of cable covers 12 are not completely pushed together. By pushing the locking nut 72 over the pair of cable covers 12, the cable covers 16 of the pair of cable covers 16 may automatically be pushed together, further facilitating the locking of the housing 1 in the operating position 64. Consequently, an easy single-handed installation is possible, which further decreases the space requirements for installation.

Each cable cover 16 of the pair of cable covers 12 may have a guiding groove 76 on their respective outer surface facing away from each other at least in the operating position 64, as shown in FIG. 4. The guiding groove 76 may extend from the distal end 55 of the respective cable cover 16 towards the proximal end 14 and may taper circumferentially towards the proximal end 14. Therefore, the guiding groove 76 may form a mouth at the distal end 55 to catch a respective locking protrusion 78, allowing for an easy insertion of the respective cable cover 16 into the locking nut 72, even when the respective cable cover 16 and the locking nut 72 are not perfectly rotationally aligned. By pushing the locking nut 72 over the respective cable cover, the locking protrusion 78 slides along the tapering guiding groove 76, resulting in an automatic realignment of the cable cover 16 relative to the locking nut 72.

The cable cover 16 may further comprise a locking recess 80 arranged circumferentially adjoining to the guiding groove 76 at its end closer to the proximal end 14 of the cable cover 16, as shown in FIG. 4, forming an L-shape. Therefore, the locking protrusion 78 of the locking nut 72 may be pushed along the guiding groove 76 until abutment, and then by a simple twist movement, be brought into the locking recess 80. The locking protrusion 78 and the locking recess 80 may form a positive fit locking movement in a direction parallel to the insertion direction I.

As shown in FIG. 4, a locking rib 82 protruding radially from the respective cable cover 16 may be provided between the guiding groove 76 and the locking recess 80. The locking rib 82 may prevent the locking protrusion 78 from unintentionally exiting the locking recess 80 due to movements such as vibrations. Thus, the locking rib 82 may further secure the locking engagement of the locking nut 72 to the respective cable cover 16. The locking rib 82 may be beveled towards the guiding groove 76, forming a ramp allowing for an easy movement of the locking protrusion 78 from the guiding groove 76 over the locking rib 82 to the locking recess 80. The locking rib 82 may comprise an abutment surface 84 extending radially form the cable cover 16, i.e. extending essentially perpendicular to the locking recess 80, facing the locking recess 80. Therefore, the locking protrusion 78 abuts the abutment surface 84 when moving from the locking recess 80 towards the guiding groove 76, restricting any further movement.

The locking nut 72, in the embodiment shown in FIG. 5, has two locking protrusions 78 protruding from an inner surface of the locking nut 72 radially inwards. The locking protrusions 78 and the locking nut 72 may be formed integrally with one another. Thus, the locking protrusions 78 and the locking nut 72 may be produced cost efficiently in a single production step, such as injection molding.

The two locking protrusions 78 are arranged diametrically to one another and each locking protrusion 78 may be adapted to be inserted in the locking recess 80 of different cable covers 16 of the pair of cable covers 12. In other words, each cable cover 16 of the pair of cable covers 12 may be adapted to receive one of the two locking protrusions 78. Thus, both cable covers 16 of the pair of cable covers 12 may be locked to the locking nut 72.

The locking nut 72 and/or the pair of cable covers 12 may be formed from an insulating material, for example by an injection molding process.

The locking nut 72 may comprise a polygonal outer contour such as an octagon as shown in FIGS. 3 and 5 or a hexagon. Alternatively or additionally, the locking nut 72 may comprise handlebars, i.e. ribs protruding from the outer surfaces of the locking nut 72 having a gripping function for easier handling of the locking nut 72. With the polygonal outer contour, an easy handling of the locking nut 72 is possible, for example with a tool such as a complementary wrench. Thus, enabling locking and/or unlocking of the locking nut 72 when the locking nut 72 is not reachable by hand, for example due to space constraints.

In order to determine the relative rotational position of the locking nut 72 relative to the pair of cable covers 12, the locking nut 72 may comprise a marking 86 on the outer surface of the locking nut 72. Hence, the state, i.e. locked or unlocked, of the locking nut 72 and the pair of cable covers 12 may be easily determined. Furthermore, the locking nut 72 may be arranged in a correct rotational position relative to the pair of cable covers 12 for the locking protrusion 78 to be sliding along the guiding groove 76.

The pair of cable covers 12 can be adapted to the application requirements, so that the cable 10 can be redirected as desired. The cable installation may vary depending on the available space. Thus, by having a pair of cable covers 12, which can be hinged to the housing body 6, the orientation of the cable cover 12 can be adapted to the application surroundings. Furthermore, the pair of cable covers 12 form the cable support sleeve 66 in the operating position 64 configured to support the cable 10, in an embodiment directly. Hence, the pair of cable covers 12 further provides a strain relief for the cable 10, securing the electrical and mechanical integrity and overall performance of the electric connector 4. The cable covers 12 directly prevent mechanical force applied to the exterior part of the cable 10 from being transferred to the electrical terminations of the cable 10 within the electrical connector 4. The housing 1 provides a two-part cable support sleeve 66 for strain relief, which can easily be adapted to be oriented in different directions relative to the opening 8.

What is claimed is:

1. A grounding connector, comprising:
- a housing body having an opening receiving a cable in an insertion direction;
- a pair of cable covers hinged to the housing body at a proximal end of each cable cover of the pair of cable covers, each cable cover having a strain relief spring biased toward the other cable cover in an operating position, the pair of cable covers extend away from the opening, each of the cable covers is pivoted away from the other cable cover in a cable mounting position and each cable cover is pivoted toward the other cable cover to form a cable support sleeve supporting the cable in the operating position;
- a locking nut locking the pair of cable covers in the operating position; and
- a bayonet locking assembly locking the locking nut and the pair of cable covers in the operating position.

2. The grounding connector of claim 1, wherein each cable cover is pivoted around a pivoting axis oriented perpendicular to the insertion direction.

3. The grounding connector of claim 1, wherein each cable cover has a fixation latch locking the cable in the opening in the operating position.

4. The grounding connector of claim 1, wherein the strain relief spring has an arch arranged in a cutout of the cable cover.

5. The grounding connector of claim 1, wherein each cable cover has a tapered distal end distanced from the housing body.

6. The grounding connector of claim 1, wherein at least one of the cable covers has a guiding protrusion guided into a receiving notch of the other cable cover in the operating position.

7. The grounding connector of claim 1, further comprising a locking rib securing a locking engagement of the locking nut to the pair of cable covers.

8. The grounding connector of claim 1, wherein the locking nut extends in a direction parallel to a direction in which the cable extends at a position of the locking nut.

9. The grounding connector of claim 1, wherein the locking nut at least partially receives the pair of cable covers in the operating position.

10. The grounding connector of claim 1, wherein each cable cover has a grounding spring contacting a cable braid of the cable.

11. The grounding connector of claim 10, wherein each cable cover has a fixation latch locking the cable in the opening in the operating position.

12. The housing grounding connector of claim 11, wherein at least two of the grounding spring, the fixation latch, and the strain relief spring are formed integrally with one another as a monolithic component.

13. A ground connector assembly, comprising:
- a pair of grounding connectors, each of the grounding connectors includes:

a housing body having an opening receiving a cable in an insertion direction; and a pair of cable covers hinged to the housing body at a proximal end of each cable cover of the pair of cable covers, each cable cover having a strain relief spring biased toward the other cable cover in an operating position, the pair of cable covers extend away from the opening, each of the cable covers is pivoted away from the other cable cover in a cable mounting position and each cable cover is pivoted toward the other cable cover to form a cable support sleeve supporting the cable in the operating position, the strain relief spring has an arch arranged in a cutout of the cable cover, each of the grounding connectors has identically structured housing bodies and differently formed pairs of cable covers.

14. The ground connector assembly of claim 13, wherein the differently formed pairs of cable covers each form a cable outlet at their distal ends opposite the openings of the housing bodies.

15. The ground connector assembly of claim 14, wherein the cable outlets of the differently formed pairs of cable covers are oriented differently with respect to the insertion direction.

16. A grounding connector, comprising:

a housing body having an opening receiving a cable in an insertion direction; and a pair of cable covers hinged to the housing body at a proximal end of each cable cover of the pair of cable covers, each cable cover having a grounding spring contacting a cable braid of the cable, each cable cover extends away from the opening, each cable cover is spaced apart from the other cable cover in a cable mounting position and each cable cover is spaced less far apart from the other cable cover in an operating position, each cable cover has a strain relief spring biased toward the other cable cover in the operating position.

17. The grounding connector of claim 16, further comprising a locking nut locking the pair of cable covers in the operating position.

18. The grounding connector of claim 16, wherein each cable cover has a tapered distal end distanced from the housing body.

19. The grounding connector of claim 16, wherein each cable cover has a fixation latch locking the cable in the opening in the operating position.

20. The grounding connector of claim 19, wherein at least two of the grounding spring, the fixation latch, and the strain relief spring are formed integrally with one another as a monolithic component.

21. A ground connector assembly, comprising:

a pair of grounding connectors, each of the grounding connectors includes:

a housing body having an opening receiving a cable in an insertion direction; and a pair of cable covers hinged to the housing body at a proximal end of each cable cover of the pair of cable covers, each cable cover having a grounding spring contacting a cable braid of the cable, each cable cover extends away from the opening, each cable cover is spaced apart from the other cable cover in a cable mounting position and each cable cover is spaced less far apart from the other cable cover in an operating position, each cable cover has a strain relief spring biased toward the other cable cover in the operating position, each of the grounding connectors has identically structured housing bodies and differently formed pairs of cable covers.

22. The ground connector assembly of claim 21, wherein the differently formed pairs of cable covers each form a cable outlet at their distal ends opposite the openings of the housing bodies.

23. The ground connector assembly of claim 22, wherein the cable outlets of the differently formed pairs of cable covers are oriented differently with respect to the insertion direction.

24. A grounding connector, comprising:

a housing body having an opening receiving a cable in an insertion direction; and a pair of cable covers hinged to the housing body at a proximal end of each cable cover of the pair of cable covers, each cable cover having a strain relief spring biased toward the other cable cover in an operating position, the pair of cable covers extend away from the opening, each of the cable covers is pivoted away from the other cable cover in a cable mounting position and each cable cover is pivoted toward the other cable cover to form a cable support sleeve supporting the cable in the operating position, each cable cover has a grounding spring contacting a cable braid of the cable.

25. A grounding connector, comprising:

a housing body having an opening receiving a cable in an insertion direction; and a pair of cable covers hinged to the housing body at a proximal end of each cable cover of the pair of cable covers, each cable cover having a strain relief spring biased toward the other cable cover in an operating position, the pair of cable covers extend away from the opening, each of the cable covers is pivoted away from the other cable cover in a cable mounting position and each cable cover is pivoted toward the other cable cover to form a cable support sleeve supporting the cable in the operating position, each cable cover has a fixation latch locking the cable in the opening in the operating position.

26. A grounding connector, comprising:

a housing body having an opening receiving a cable in an insertion direction; and a pair of cable covers hinged to the housing body at a proximal end of each cable cover of the pair of cable covers, each cable cover having a strain relief spring biased toward the other cable cover in an operating position, the pair of cable covers extend away from the opening, each of the cable covers is pivoted away from the other cable cover in a cable mounting position and each cable cover is pivoted toward the other cable cover to form a cable support sleeve supporting the cable in the operating position, the strain relief spring has an arch arranged in a cutout of the cable cover.

* * * * *